C. G. McKELLAR.
CHAIN ADJUSTMENT DEVICE FOR CYCLES.
APPLICATION FILED JUNE 3, 1911.
1,001,972.
Patented Aug. 29, 1911.
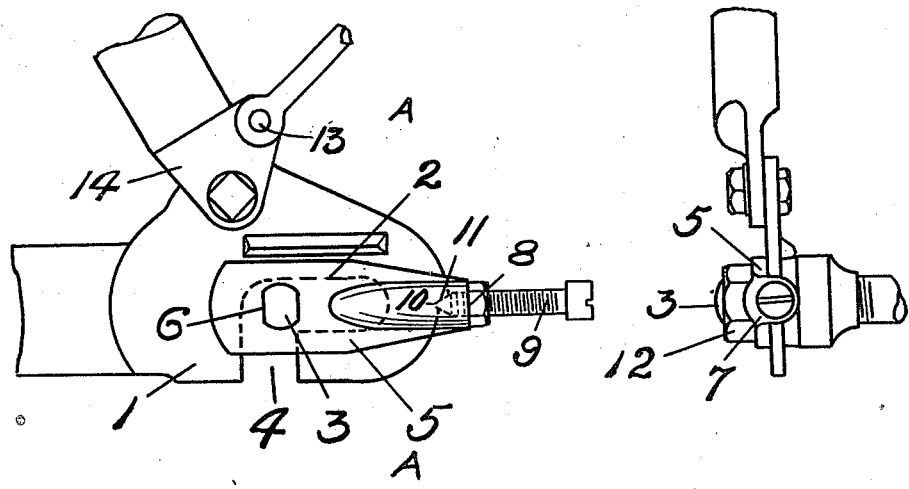
FIG. 1.
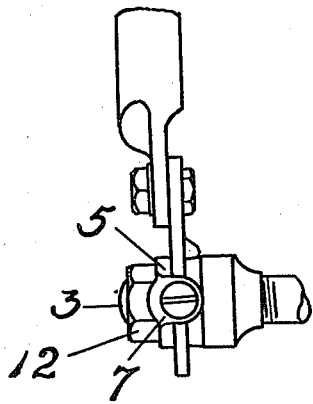
FIG. 3.
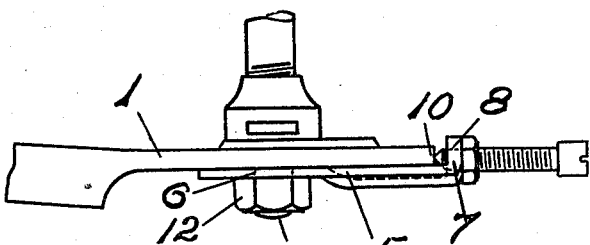
FIG. 2.
FIG. 4.
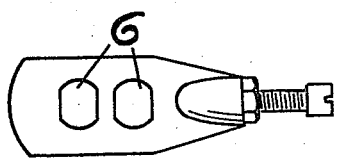
FIG. 5.
WITNESSES:
John C. Sanders
Arthur S. Pettit
INVENTOR:
Cecil George McKellar
BY
ATTY.
COLUMBIA PLANOGRAPH CO., WASHINGTON, D. C.

UNITED STATES PATENT OFFICE.

CECIL GEORGE McKELLAR, OF CHRISTCHURCH, NEW ZEALAND.

CHAIN-ADJUSTMENT DEVICE FOR CYCLES.

1,001,972.　　　　Specification of Letters Patent.　Patented Aug. 29, 1911.

Application filed June 3, 1911. Serial No. 631,039.

*To all whom it may concern:*

Be it known that I, CECIL GEORGE MCKELLAR, subject of the King of Great Britain, residing at 100 Gloucester street, Christchurch, in the Province of Canterbury and Dominion of New Zealand, have invented new and useful Improvements in Chain-Adjustment Devices for Cycles, of which the following is a specification.

This invention relates to chain adjustment devices for cycles and relates more especially to the class in which the necessary backward movement of the rear axle within the slot formed to receive it in the frame is effected by means of a screw.

The object of the present invention is to provide an arrangement which will allow of the rear wheel being quickly detached without interference by mudguard stays, the arrangement being such that the position of the axle can be pre-arranged and after slipping the wheel can be returned to its old position without further adjustment.

In order that the nature of the invention may be fully understood reference will now be made to the accompanying drawings in which:—

Figure 1.— is a side elevation of a rear wheel fitting constructed in accordance with the invention, the nut and washer being removed from the end of the axle for clearance. Fig. 2.— is a plan view of the same, Fig. 3.— is a rear view of the same with the nut and washer in place, Fig. 4.— is a cross section on the line A—A, Fig. 1. and Fig. 5.— is a detail view of the plate.

1 is a plate attached to the rear extremity of the back fork and provided with a slot 2 for the reception of the axle 3, sufficient movement being allowed to permit the tension adjustment of the chain as usual.

The slot 2 is of the form shown, having its rear end closed and the opening 4 through which the axle is inserted extends through the plate beneath and near the forward end of the slot.

According to the present invention the plate 5 is placed upon the outer face of the slot, such plate 5 being provided with a hole 6 through which the end of the axle passes while its rear end extends beyond the rear extremity of the plate 1 and is bent over at right angles across the end of the plate 1 so as to form a lug 7, as shown in Figs. 2 and 3. A hole 8 is formed through the lug 7, such hole being tapped to receive a set screw 9 which is inserted from the back so that its point bears against the rear edge of the plate 1 which is formed preferably with a slight recess 10 to receive the point of the screw and a projection or stop 11 arranged above to prevent the screw from lifting up. A suitable lock-nut is provided to prevent the screw 9 from turning after the chain adjustment has been made. It will be seen that by this arrangement the action of screwing up the set screw will cause the plate 5 and with it the axle to move backward thus tightening the chain.

The axle 3 is locked in place after the chain adjustment has been made by means of the usual nut 12 as shown.

The plate 5 is preferably stamped from sheet metal and in order to provide clearance for the screw 9, the portion of such plate registering with the screw 9 may be molded to the section shown in Fig. 4, which formation also serves to reinforce that portion of the plate. If thought advisable in order to give a greater range of adjustment with a short adjusting screw, the plate may be provided with two holes 6 as shown in Fig. 5, but additional clearance from the back stay lug must be given.

In order to obtain freedom from interference by mudguard stays, a lug 13 is provided to carry them upon the back stay fitting 14 of the cycle, such lug being formed integral therewith and preferably off set from the center line as shown.

The whole construction is of course duplicated to provide fittings for the two sides of the rear wheel. Flats may be formed in the holes of the plate so that both sides move together.

In order to remove the back wheel the nuts 12 are slacked, after which the rear end of the plate 5 may be pressed down, thus forcing the point of the screw out of the recess 10 and causing it to slide around upon the edge of the plate 1. In this way the tension of the plate 5 upon the axle will be removed thus permitting such axle to move forward and pass out of the slot through the opening, while the position of the adjusting screw is not in any way interfered with. Thus the wheel may be removed and replaced again without necessitating a fresh adjustment of the chain.

I claim:

1. In a device of the class described the combination with a plate attached to the rear extremity of the back fork and having a slot adapted to receive the axle and allow of movement for tension adjustment of the chain, a strip of metal adapted to be placed upon the outer face of the slot and having a hole through which the end of the axle passes the rearward end of such strip extending in rear of the slotted plate and having its extremity bent at right angles across said plate, a tapped hole formed through said bent over portion, and a set screw passing through such hole from the rear side and having its point in contact with the rear edge of said slotted plate, substantially as and for the purpose set forth.

2. In a device of the class described, the combination with a plate attached to the rear extremity of the back fork and having a slot adapted to receive the axle and allow of movement for tension adjustment of the chain, of a strip of metal adapted to be placed upon the outer face of the slot and having two holes through either of which the end of the axle may be passed the rearward end of such strip extending in rear of the slotted plate, and having its extremity bent at right angles across the edge of said plate, a tapped hole formed through said bent over portion, and a set screw passing through such hole from the rear side and having its point in contact with the rear edge of said slotted plate, substantially as and for the purpose set forth.

3. In a device of the class described, the combination with a plate attached to the rear extremity of the back fork and having a slot adapted to receive the axle and allow of movement for adjustment of the chain, a member adapted to engage said axle and provided with a screw adapted to impinge upon the rear edge of said slotted plate for the purpose of effecting the backward movement of said axle within its slot, and a stop formed upon the rear end of such plate to prevent said screw from lifting, substantially as and for the purpose set forth.

4. In a device of the class described, the combination with a plate attached to the rear extremity of the back fork and having a slot adapted to receive the axle and allow of movement for adjustment of the chain, a member adapted to engage said axle and provided with a screw adapted to impinge upon the rear edge of said slotted plate for the purpose of effecting the backward movement of said axle within its slot, and a slight recess formed in the rear edge of said plate to receive the point of the screw, substantially as and for the purpose set forth.

In testimony whereof I have signed my name to this specification in the presence of two subscribing witnesses.

CECIL GEORGE McKELLAR.

Witnesses:
PERCY RICHMOND CLIMIE,
CYRIL CAVLYM COATES.

---

Copies of this patent may be obtained for five cents each, by addressing the "Commissioner of Patents, Washington, D. C."